Dec. 8, 1970    E. D. JACOBS ET AL    3,545,866
RING LASER WHICH UTILIZES ONLY ONE OF THE COUNTERROTATING
BEAMS TO DETERMINE ROTATION RATE
Filed June 15, 1967

INVENTORS
EARL D. JACOBS
RONALD H. DURRETT, DECEASED
By HUBERT C. SWANSON, ADMINISTRATOR
THOMAS J. HUTCHINGS
JOSEPH WINOCUR
WILBUR L. ZINGERY

By *Philip M. Hinderstein*
ATTORNEY

United States Patent Office 3,545,866
Patented Dec. 8, 1970

3,545,866
RING LASER WHICH UTILIZES ONLY ONE OF THE COUNTERROTATING BEAMS TO DETERMINE ROTATION RATE
Earl D. Jacobs, Tustin, Calif., Ronald H. Durrett, deceased, late of Yorba Linda, Calif., by Hubert C. Swanson, administrator, Yorba Linda, Calif., and Thomas J. Hutchings, Orange, Joseph Winocur, Newport Beach, and Wilbur L. Zingery, Long Beach, Calif., assignors to North American Rockwell Corporation, El Segundo, Calif., a corporation of Delaware
Filed June 15, 1967, Ser. No. 648,531
Int. Cl. G01b 9/02; H01s 3/00
U.S. Cl. 356—106                                              11 Claims

ABSTRACT OF THE DISCLOSURE

A pickoff for a ring laser gyroscope having two beams of light travelling in opposite directions around a closed optical path in which a small fraction of one of the rotating beams is directed out of the optical path onto a photodetector in order to detect the intensity variations of said one beam to determine the beat frequency between the oppositely rotating beams.

BACKGROUND OF THE INVENTION

Field of the invention

The present invention relates to a ring laser gyroscope pickoff and, more particularly, to a simplified method and means for measuring the frequency difference between the counterrotating beams in a ring laser gyroscope without the use of conventional combining optics.

Description of the prior art

When a beam of light is directed around a closed optical path, for example, the perimeter of a triangle or square, it returns to its starting point after a finite, measurable, time interval. If the optical path is rotating about an axis which is normal to the plane of the path, and if the light beam is travelling in the same direction that the path is rotating, the time interval for traversing the path will be increased by the finite displacement of the starting point during the time required for the beam to completely traverse the optical path. If a second light beam is travelling around the optical path in a direction opposite to the direction of rotation of the path, the time interval for traversing the path will be decreased by the finite displacement of the starting point during the traversal time. Also, since light beams travelling in opposite directions around a closed optical path will effectively experience different path lengths when the optical path is rotated continuously in one direction, a phase difference will occur for the two light beams in returning to their common starting point. This phase difference results in a frequency difference between the two oppositely rotating light beams. Since this frequency difference is directly related to the rotation rate of the optical path, numerous techniques have been investigated for applying this phenomena to a practical rotation rate sensor. With the advent of the laser, and, more particularly, the ring laser, the possibility of its use in a rotation rate sensor has become practical. The result has been numerous operational ring laser gyroscopes.

A typical ring laser gyroscope consists of a square or triangular light path with highly reflecting mirrors at the corners thereof. The source of light consists of at least one helium-neon gas discharge tube along one or more sides of the square or triangle. The ring laser operates as an oscillator. When the gas discharge tube is initiated, the light therefrom starts around the path and is amplified as it passes through each gas tube. The gas tubes provide sufficient gain to overcome losses in the optical circuit.

Rotation of the optical path causes a change in path lengths between the clockwise and counterclockwise beams. This results in the original nonrotating mode being split into two modes, one with a frequency slightly higher and one with a frequency slightly lower than the nonrotating mode. The difference in frequency between the two beams is a function of the rotation rate. The observation of the aforementioned change in frequency is usually accomplished by directing a small fraction of each of the counterrotating light beams out of the ring laser cavity onto a photodetector surface. This directing of the two beams is usually accomplished through the use of a complicated array of optical components commonly referred to as combining optics. The combining optics are operative to heterodyne the two light beams by rendering them colinear on the same path. However, these combining optics are expensive, voluminous, and very difficult to properly align in order to insure that the two beams are directed onto the photosurface along a highly coincident path.

SUMMARY OF THE INVENTION

According to the present invention, there is provided an improved ring laser gyroscope and pickoff combination which features the elimination of these combining optics and the elimination of the necessity for externally deflecting and combining the two counterrotating beams. According to the present invention, a direct optical connection is made between either of the counterrotating light beams in the ring laser cavity and a photodetector without using the usual combining optics. The direct optical connection may be made in any of several ways. In any event, the single output beam contains all the information necessary to determine the ring laser rotation rate in inertial space. This is because the intensity of the single output beam is amplitude modulated at a rate proportional to the ring laser rotation rate. The intensity modulation is detected and measured by techniques well known in the art.

OBJECTS

It is, therefore, an object of the present invention to provide a pickoff for a ring laser gyroscope which eliminates conventional combining optics.

It is a further object of the present invention to provide a pickoff for a ring laser gyroscope which eliminates the necessity to externally deflect and combine the two counterrotating beams.

It is a still further object of the present invention to provide a ring laser gyroscope which includes a direct optical connection between either of the counterrotating light beams in the ring laser cavity and a photodetector without using conventional combining optics.

It is another object of the present invention to provide a ring laser gyroscope in which one of the counterrotating beams is sampled to measure the amplitude modulations thereupon.

Another object of the present invention is the provision of means for determining the frequency difference between the counterrotating beams in a ring laser gyroscope by detecting the intensity variations of one of the beams.

Still another object of the present invention is the provision of a method for determining the frequency difference between the counterrotating beams in a ring laser gyroscope by detecting the intensity variations of one of the beams.

Still other objects, features, and attendant advantages of the present invention will become apparent to those skilled in the art from a reading of the following detailed description of a preferred embodiment constructed in accordance therewith taken in conjunction with the accompanying drawings wherein:

DESCRIPTION OF THE PREFERRED EMBODIMENT

Figure 1:
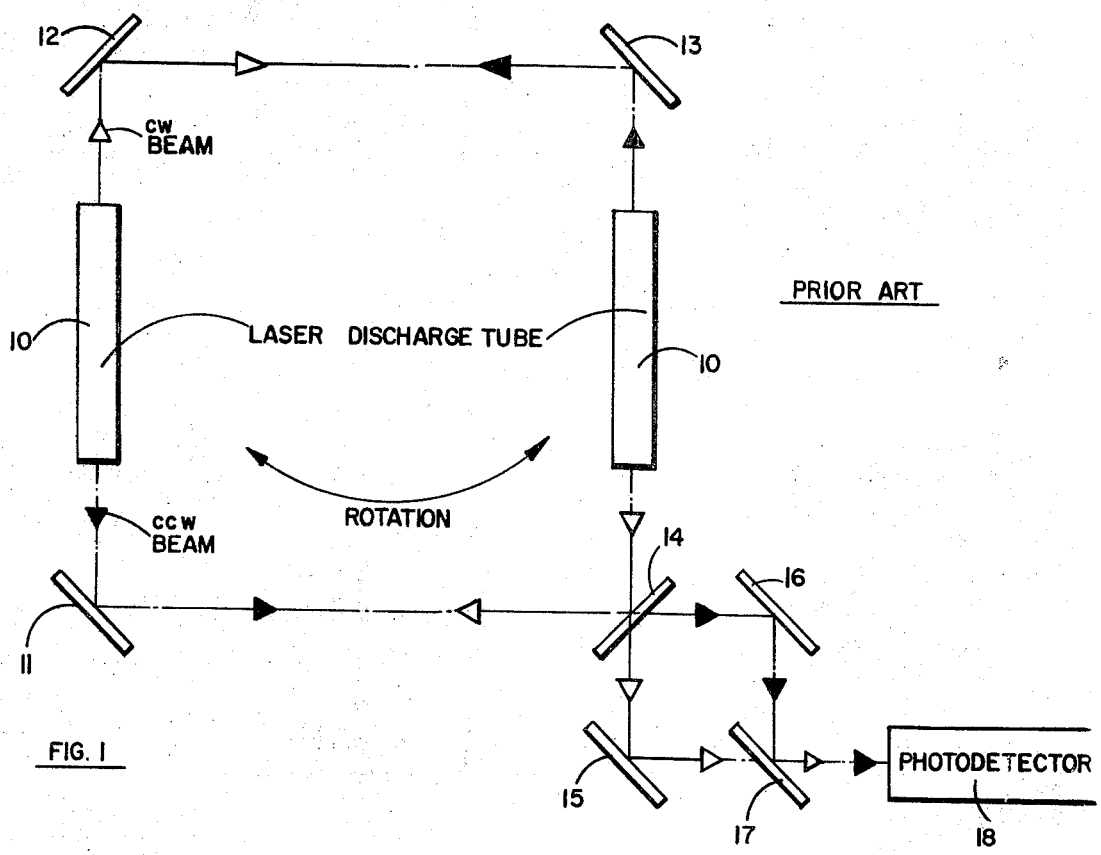
FIG. 1 is a chematic representation of a typical prior art optical configuration for a ring laser gyroscope showing the combining optics.

Referring now to the drawings, and, more particularly, to FIG. 1 thereof, there is shown a typical prior art ring laser configuration. The configuration consists of at least one laser discharge tube 10, two being shown in FIG. 1, which may be helium-neon plasma tubes which operate as the gain elements in the optical path. Also included are three totally reflecting mirrors 11, 12 and 13 and a partially reflecting output mirror 14.

Discharge tubes 10, in combination with mirrors 11–14, form a square, closed optical path. When discharge tubes 10 are initiated, they radiate a whole spectrum of light. The photons of light start around the optical path and as they pass through each discharge tube they are amplified and continue around the path. In this manner, the intensity builds up and the ring laser configuration becomes self-oscillating and self-sustaining.

Laser discharge tubes 10 are also operative to provide two beams which circulate in opposite directions around the closed optical path. The clockwise beam is represented by the white arrows in FIG. 1 and the counterclockwise beam is represented by the black arrows. If the entire optical configuration is rotated around any axis that is not in the plane of FIG. 1, the counterrotating beams will effectively experience different path lengths in returning to their common starting point. This effective path length change results in a frequency difference between the two beams which may be sensed to determine the rotation rate.

In order to observe this change in frequency, it is necessary to direct a small fraction of each of the counterrotating light beams out of the ring laser cavity onto a photodetector surface. To accomplish this purpose, the ring laser of FIG. 1 is provided with a typical array of optical elements which are generally known as combining optics. In FIG. 1, the combining optics consist of partially reflecting output mirror 14, a pair of totally reflecting mirrors 15 and 16, and a 50% silvered combining mirror 17. Through the operation of partially reflecting mirror 14, a portion of the CCW beam from mirror 11 passes through mirror 14 to be reflected by mirror 16 onto mirror 17 where it is again reflected onto a path to a photodetector 18. Also through the operation of mirror 14, a portion of the CW beam from mirror 13 is transmitted through mirror 14 to be reflected by mirror 15 towards mirror 17. The beam passes through mirror 17 and emerges colinearly with the CCW beam on the path to photodetector 18. In this manner, the CW and CCW beams are optically mixed, or heterodyned, and applied to photodetector 18. Photodetector 18 detects the beat frequency between the two beams and provides a sinusoidal output signal as a function thereof.

Figure 2:
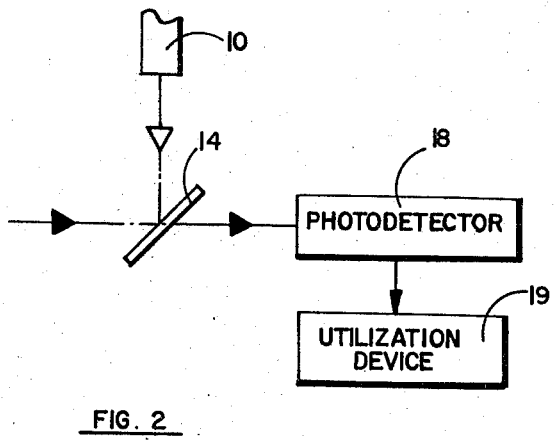
FIGS. 2 and 3 are schematic representations of pickoffs constructed in accordance with the teachings of the present invention.

According to the present invention, an improved ring laser gyroscope and pickoff combination is provided which permits the elimination of the expensive and voluminous combining optics. This is accomplished by providing a direct optical connection between either of the counterrotating light beams in the ring laser cavity and the photodetector. The direct optical connection may be made in any of several ways. If a configuration such as that shown in FIG. 1 is to be used, the optical connection may be made by simply eliminating mirrors 15, 16 and 17 and by relocating photodetector 18 so as to receive the portion of either the CCW beam or the CW beam transmitted through partially reflecting output mirror 14. This is shown in FIG. 2 for the case where the CCW beam is received by photodetector 18. Photodetector 18 is operative to monitor the intensity of the CCW beam and to provide an output signal as a function of the variations thereof. Many other ways to provide a direct optical connection between the ring laser cavity and the photodetector will be apparent to those skilled in the art. As another example, the configuration of FIG. 3 may be used.

Figure 3:
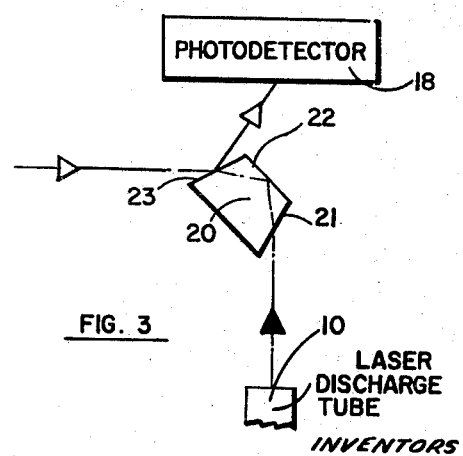

Referring now to FIG. 3, any of the totally reflecting mirrors 11–13 or the partially reflecting mirror 14 as shown in FIG. 1 may be replaced by a prism reflector 20. In fact, for many applications, prism reflectors are preferred over mirrors in that mirrors generally have rough optical surfaces and the imperfections on the surface of a mirror operate as a scattering center. Since a piece of glass or quartz can be polished extremely well, the scattering centers can be minimized by using a prism instead of a mirror.

The light emanating from discharge tubes 10 is generally plane polarized. If a plane polarized beam of light is passed normally through a sheet of glass, it will suffer about a 3% reflection loss. However, if a beam of plane polarized light passes through the surface of a sheet of glass at a certain angle, the beam will go through with zero reflection loss. This angle is known as Brewster's angle. Therefore, surface 21 of prism 20 may be adjusted so that the CCW beam strikes it at Brewster's angle resulting in zero loss at surface 21. In addition, the back surface 22 of prism 20 may be adjusted for total internal reflection so that the incoming beams are reflected with zero loss. Normally, surface 23 of prism 20 would also be adjusted to be at Brewster's angle so that there would be no loss thereat. However, in order to sample a portion of the CW beam, surface 23 can be adjusted to be at nearly Brewster's angle so that there is a small reflection loss. In this manner a controllable portion of the CW beam may be directed to photodetector 18.

Whether the pickoffs of FIG. 2 or FIG. 3 or any other configuration is used, the output of photodetector 18 is a signal which varies as a function of the intensity of one of the counterrotating beams. In accordance with the present invention, the single output beam contains all the information necessary to determine the ring laser rotation rate in inertial space. The information takes the form of an intensity modulation of each of the beams at a rate which is proportional to the ring laser rotation rate. As a result, by detecting and measuring the intensity modulation of either of the beams, the rotation rate may be determined.

The intensity modulation of each of the counterrotating beams is presently thought to be the result of light from one of the beams being back-scattered into the other beam and being optically mixed in some nonlinear laser component such as the plasma of he-ne in a helium-neon gas laser. In other words, in a conventional ring laser gyroscope, with two counterrotating beams traveling around the same optical path, if either of the beams hits a scattering center such as a dust particle and part of the scattered beam is reversed in direction, it will now be colinear and traveling in the same direction as the other beam. In this manner, a small portion of the CCW beam is caused to travel in the same direction as the CW beam and a small portion of the CW beam is caused to travel in the same direction as the CCW beam. When these composite beams reach the gain elements, such as discharge tubes 10, the gain elements just see the sum electromagnetic wave and it is amplified as such. In other words, considering the CW beam, for example, and the small portion of the CCW beam which is superimposed thereupon, when this composite beam reaches discharge tube 10, it is optically mixed and amplified since discharge tube 10 cannot distinguish between the two beams.

In addition, because the two beams are at different frequencies, in the presence of rotation, the CW beam and the portion of the CCW beam superimposed upon it go in and out of phase as a function of time. The result is a composite signal whose intensity increases and decreases at the difference frequency rate. Therefore, by picking off a portion of one of the beams and measuring its intensity modulation, the difference frequency can be determined.

It is significant to note that the same procedure cannot be followed if conventional combining optics are employed. The reason for this is that even though the CW beam and the CCW beam are both amplitude modulated, they are modulated exactly 180° out of phase so that when one of the beams is getting brighter the other is getting dimmer. When the beams are rendered colinear, as is accomplished by mirrors 14, 15, 16 and 17 in FIG. 1, the average of the two beams is constant and the amplitude modulation upon each cancels out.

The output of photodetector 18 may be applied to a utilization device 19, as shown in FIG. 2. Utilization device 19 may be any one of several types of known circuits used with ring laser gyroscopes. For example, utilization device 19 may consist of a counter for transforming each full cycle of the output of photodetector 18 into a pulse. In this manner, a digital output may be provided where the number of pulses represent the amount of rotation, in inertial space, of the closed optical path and the pulse repetition rate represents the rotation rate. Utilization device 19 may also include a digital computer for receiving the pulse train and for providing a signal to control the operation of an inertial guidance system as a function of the rotation information provided by the ring laser gyroscope.

While the invention has been described with respect to several physical embodiments constructed in accordance therewith, it will be apparent to those skilled in the art that various modifications and improvements may be made without departing from the scope and spirit of the invention. For example, the present technique can be employed with essentially any type of ring laser device since there is virtually always a small amount of backscattering which will result in the amplitude modulation of each of the counterrotating beams. Furthermore, it will be apparent to those skilled in the art that any kind of retroreflecting device may be located either within the cavity or externally thereof to increase and control the amplitude modulation of each of the beams. In addition, numerous techniques for providing a direct optical connection between one of the counterrotating beams and the photodetector will be apparent to those skilled in the art other than those specifically mentioned herein. Accordingly, it is to be understood that the invention is not to be limited by the specific illustrative embodiments but only by the scope of the appended claims.

What is claimed is:

1. In a ring laser having two beams of light travelling in opposite directions around a closed optical path and wherein each of said beams contains difference frequency information in response to rotation of said optical path;
   means for sampling a portion of at least one of said beams;
   means for individually detecting any intensity variations of said difference signal frequency in said sampled beam; and
   means for utilizing said detected difference signal frequency information in only one of said beams to provide an indication of any rotation of said optical path.

2. The ring laser of claim 1 wherein said means for sampling comprises means for directing a small fraction of one of said beams out of said optical path.

3. The ring laser of claim 1 wherein said means for detecting the signal frequency of said sampled beam comprises:
   means operatively positioned to receive said sampled beam for converting said beam into an electrical signal which varies as a function of the signal frequency of said beam.

4. The ring laser of claim 1 wherein said means for detecting the intensity variations of said sampled beam includes threshold detection means operative to detect the amplitude modulation of said sampled beam to produce a series of pulses having a repetition rate corresponding to said signal frequency.

5. In combination:
   a ring laser comprising:
      at least one laser discharge tube;
      a plurality of reflecting surfaces, said discharge tube and said reflecting surfaces forming a closed optical path having two beams of light travelling in opposite directions around said path, whereby rotation of said optical path causes a frequency difference between said oppositely rotating light beams; and wherein each of said beams contains information as to said frequency difference;
   means for determining said frequency difference comprising:
      means for directly detecting the intensity modulation of said difference frequency of at least one of said two light beams; and
      means for utilizing said detected modulation from only one of said beams at the difference frequency to indicate the rate of rotation of said optical path as a function of the frequency of said difference frequency.

6. In a ring laser having at least one laser discharge tube so that two beams of light are caused to travel in opposite directions around a closed optical path whereby rotation of said optical path causes a frequency difference between said oppositely rotating light beams, and wherein each of said beams contains information as to the frequency difference, means for sensing the information at the difference frequency of one of said two oppositely rotating light beams; and
   means for utilizing the sensed information in only one of said beams.

7. In a ring laser having two beams of light travelling in opposite directions around a closed optical path whereby rotation of said optical path causes a frequency difference between said oppositely rotating light beams, and wherein each of said beams contains information as to said frequency difference, the method of determining rotation of the optical path comprising the step of:
   detecting and utilizing the intensity modulation of only one of said beams to produce a signal output having a frequency which is equal to any frequency difference of said beams.

8. In a ring laser gyroscope having two beams of light travelling in opposite directions around a closed optical path whereby rotation of said optical path causes a frequency difference between said oppositely rotating light beams, and wherein each of said beams contains information as to said frequency difference, the method of determining said frequency difference comprising the steps of:
   directing a fraction of at least one of said beams out of said optical path;
   detecting the frequency of any intensity modulation of said one beam to produce a signal output varying at a rate which is a function of any rotation of said optical path; and
   utilizing the signal output of only one of said beams to provide an indication of rotation of said optical path.

9. In a ring laser gyroscope having two beams of light travelling in opposite directions around a closed optical path whereby rotation of said optical path causes a frequency difference between said oppositely rotating light beams, the method of determining said frequency difference comprising the steps of:
   detecting a fraction of one of said beams out of said optical path; and
   detecting the frequency of any intensity modulation of said one beam to produce a signal output varying at a rate which is a function of any rotation of said optical path.

10. The method according to claim 8 in which said utilizing step comprises producing a digital signal having a repetition rate corresponding to said frequency difference.

11. In a ring laser having at least two beams of light travelling in opposite directions around a closed optical path and producing intensity variations of a difference signal frequency in response to rotation of said optical path wherein each of said beams contains information as to said difference frequency;
  means for sampling at least one of said beams;
  means for detecting intensity variations of any difference signal frequency in only one of said sampled beams; and
  means responsive to said difference signal frequency for utilizing said difference signal frequency to produce an indication of rotation of said ring laser as a function of said difference signal frequency.

References Cited

UNITED STATES PATENTS 3,411,849  11/1968  Aronowitz _____ 356—28

RONALD L. WIBERT, Primary Examiner

E. S. BAUER, Assistant Examiner

U.S. Cl. X.R.

331—94.5